United States Patent
Rogers et al.

(10) Patent No.: US 9,736,216 B2
(45) Date of Patent: *Aug. 15, 2017

(54) MEDIA TOOLBAR AND AGGREGATED/DISTRIBUTED MEDIA ECOSYSTEM

(71) Applicant: Yahoo! Inc., Sunnyvale, CA (US)

(72) Inventors: Ian C. Rogers, Santa Monica, CA (US); Matthew Kozlov, Santa Monica, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,443

(22) Filed: Dec. 26, 2012

(65) Prior Publication Data

US 2013/0185422 A1 Jul. 18, 2013

Related U.S. Application Data

(63) Continuation of application No. 11/962,747, filed on Dec. 21, 2007, now Pat. No. 8,375,131.

(51) Int. Cl.
   H04L 29/08 (2006.01)
   G06F 17/30 (2006.01)
   G06Q 30/02 (2012.01)

(52) U.S. Cl.
   CPC ...... H04L 67/025 (2013.01); G06F 17/30867 (2013.01); G06Q 30/02 (2013.01); H04L 29/08099 (2013.01)

(58) Field of Classification Search
   CPC ............. H04L 29/08099; H04L 67/025; G06F 17/30867; G06Q 30/02

(Continued)

(56) References Cited

U.S. PATENT DOCUMENTS

| 6,202,062 B1 * | 3/2001 | Cameron | G06F 17/30876 |
| 7,181,488 B2 * | 2/2007 | Martin | G06Q 30/02 |
| | | | 705/52 |

(Continued)

FOREIGN PATENT DOCUMENTS

| JP | 2005-331681 | 12/2005 |
| JP | 2007-172091 | 7/2007 |
| KR | 1020060062967 | 6/2006 |

OTHER PUBLICATIONS

U.S. Appl. No. 11/962,747 : Application as Filed on Jan. 23, 2007, 50 Pages.

(Continued)

*Primary Examiner* — Michael C Lai

(74) *Attorney, Agent, or Firm* — Berkeley Law & Technology Group, LLP

(57) ABSTRACT

A method and network architecture through which user-specific media profile data can be made available to third parties. A browser is optionally enhanced to facilitate playback and control of one or more media players, thereby allowing the user to play content via the browser. As the user plays content in the browser or any of the media players, information is collected about the content and stored in a database. By monitoring all media-related interactions made by the user within the browser, the collected content information can encompass information from a wide range of sources. User-specific profile data is then determined based on the collected data and such user-specific profile data is made available to third parties. The user-specific profile data can be used, for example, for social networking purposes, and may also be used to drive advertisements or other content to the user.

23 Claims, 13 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 7,346,552 | B1* | 3/2008 | Salzinger | G06Q 20/10 |
| | | | | 705/26.43 |
| 7,346,649 | B1* | 3/2008 | Wong | G06F 17/30867 |
| | | | | 707/E17.109 |
| 8,375,131 | B2 | 2/2013 | Rogers | |
| 8,776,149 | B1* | 7/2014 | Koch | H04N 21/4334 |
| | | | | 725/37 |
| 2002/0013852 | A1* | 1/2002 | Janik | H04L 12/2856 |
| | | | | 709/231 |
| 2003/0023427 | A1* | 1/2003 | Cassin | H04N 7/17318 |
| | | | | 704/201 |
| 2003/0144918 | A1* | 7/2003 | Novelli | G06F 17/30766 |
| | | | | 700/94 |
| 2004/0019658 | A1* | 1/2004 | Plastina | G06F 17/30017 |
| | | | | 709/217 |
| 2004/0088355 | A1* | 5/2004 | Hagan | G06F 21/6254 |
| | | | | 709/203 |
| 2005/0091107 | A1* | 4/2005 | Blum | G06F 17/30029 |
| | | | | 705/14.65 |
| 2006/0085429 | A1* | 4/2006 | Wener | H04L 12/5875 |
| | | | | 709/206 |
| 2006/0143674 | A1* | 6/2006 | Jones | G06Q 30/02 |
| | | | | 725/113 |
| 2006/0161635 | A1* | 7/2006 | Lamkin | G06F 17/30041 |
| | | | | 709/217 |
| 2006/0173910 | A1* | 8/2006 | McLaughlin | G06F 17/30053 |
| 2007/0220430 | A1 | 9/2007 | Sato | |
| 2007/0250467 | A1* | 10/2007 | Mesnik | G06F 17/3089 |
| 2008/0091771 | A1* | 4/2008 | Allen | G06Q 10/06 |
| | | | | 709/203 |
| 2008/0133311 | A1* | 6/2008 | Madriz Ottolina | G06Q 10/10 |
| | | | | 705/14.69 |
| 2008/0243923 | A1* | 10/2008 | Mazor | G06Q 30/02 |
| | | | | 705/14.73 |
| 2008/0263579 | A1* | 10/2008 | Mears | G11B 27/322 |
| | | | | 725/9 |
| 2009/0164641 | A1* | 6/2009 | Rogers | G06F 17/30867 |
| | | | | 709/227 |

OTHER PUBLICATIONS

U.S. Appl. No. 11/962,747 : Notice to File Missing Parts, Mailed Jan. 23, 2008, 3 Pages.
U.S. Appl. No. 11/962,747 : Oath or Declaration as Filed on Jan. 31, 2008, 52 Pages.
U.S. Appl. No. 11/962,747 : Notice of Incomplete Reply, Mailed Feb. 7, 2008, 2 Pages.
U.S. Appl. No. 11/962,747 : Applicant Response to Pre-Exam Formalities Notice, Mailed Feb. 13, 2008, 9 Pages.
U.S. Appl. No. 11/962,747 : Filing Receipt, Mailed Mar. 13, 2008, 4 Pages.
U.S. Appl. No. 11/962,747 : Notice of Publication, Mailed Jun. 26, 2009, 2 Pages.
U.S. Appl. No. 11/962,747 : Documents Submitted with 371 Applications, Mailed Sep. 15, 2009, 14 Pages.
U.S. Appl. No. 11/962,747 : Requirement for Restriction/Election, Mailed Nov. 12, 2009, 7 Pages.
U.S. Appl. No. 11/962,747 : Response to Election / Restriction Filed, Mailed Nov. 25, 2009, 2 Pages.
U.S. Appl. No. 11/962,747 : First Action Interview—Enrollment Request, Mailed Jan. 22, 2010, 10 Pages.
U.S. Appl. No. 11/962,747 : Pre-interview first office action, Mailed Mar. 3, 2010, 3 Pages.
U.S. Appl. No. 11/962,747 : First Action Interview—Schedule Interview Request, Mailed Mar. 31, 2010, 15 Pages.
U.S. Appl. No. 11/962,747 : Supplemental Response or Supplemental Amendment, Mailed May 13, 2010, 16 Pages.
U.S. Appl. No. 11/962,747 : Examiner Interview Summary Record (PTOL-413), Mailed Jun. 1, 2010, 5 Pages.
U.S. Appl. No. 11/962,747 : Amendment/Req. Reconsideration—After Non-Final Reject, Mailed Jul. 1, 2010, 15 Pages.
U.S. Appl. No. 11/962,747 : Final Rejection, Mailed Oct. 12, 2010, 17 Pages.
U.S. Appl. No. 11/962,747 : Request for Continued Examination (RCE), Mailed Jan. 7, 2011, 13 Pages.
U.S. Appl. No. 11/962,747 : Examiner Interview Summary Record (PTOL-413), Mailed Jul. 27, 2011, 3 Pages.
U.S. Appl. No. 11/962,747 : Non-Final Rejection, Applicant Initiated Interview Summary (PTOL-413), Mailed Nov. 30, 2011, 22 Pages.
U.S. Appl. No. 11/962,747 : Amendment/Req. Reconsideration—After non-Final Reject, Mailed Feb. 13, 2012, 17 Pages.
U.S. Appl. No. 11/962,747 : Non-Final Rejection, Mailed May 8, 2012, 8 Pages.
U.S. Appl. No. 11/962,747 : Assignee Showing of Ownership per 37 CFR 3.73., Mailed Jun. 29, 2012, 1 Page.
U.S. Appl. No. 11/962,747 : Amendment/Req. Reconsideration—After Non-Final Reject, Mailed Aug. 8, 2012, 17 Pages.
U.S. Appl. No. 11/962,747 : Notice of Allowance and Fees Due, Mailed Sep. 25, 2012, 11 Pages.
U.S. Appl. No. 11/962,747 : Issue Fee Payment (PTO-85B), Mailed Dec. 26, 2012, 14 Pages.
U.S. Appl. No. 11/962,747 : Notice of Allowance and Fees Due (PTOL-85), mailed Jan. 7, 2013, 15 pages.
U.S. Appl. No. 11/962,747 : Issue notification, mailed Nov. 23, 2013, 1 pages.
PCT/US08/85909 : PCT publication, published on Jul. 9, 2009, 45 pages.
PCT/US08/85909 : PCT publication with international search report, mailed Jun. 29, 2009, 4 pages.
PCT/US08/85909 : Written Opinion, mailed Jun. 29, 2009, 5 pages.
PCT/US08/85909 : International preliminary report on patentability, issued Jun. 22, 2010, 6 pages.

* cited by examiner

MEDIA TOOLBAR AND AGGREGATED/DISTRIBUTED MEDIA ECOSYSTEM

The present Application for Patent is a continuation of application Ser. No. 11/962,747, now U.S. Pat No. 8,375,131, filed Dec. 21, 2007, entitled "Media Toolbar and Aggregated/Distributed Media Ecosystem", and assigned to the assignee hereof and hereby expressly incorporated by reference.

FIELD

The instant disclosure relates to enhancements to traditional network browsing applications.

SUMMARY

The instant disclosure is directed to a media toolbar and aggregated/distributed media ecosystem that substantially obviates one or more of the problems due to limitations and disadvantages of the related art. Features and advantages thereof will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings, and equivalents thereof.

More specifically, the instant disclosure is directed to a method and network architecture through which user-specific media profile data can be obtained, with the user's consent, by observing the media played by a user. The user-specific media profile data can then be used by those practicing other aspects of the disclosure to, by way of nonlimiting example, identify content that is likely to be of interest to the user and to allow the user to access the identified content. In addition, some aspects of the disclosure are directed to allowing third parties to access and make available the media profile data, and to identify media potentially of interest to the third parties based on a comparison of the user's media profile and a particular third party's media profile.

In some embodiments, a browser is enhanced to facilitate playback and control of one or more media players, thereby allowing the user to play content via the browser. The browser may be enhanced through the installation of a browser helper object, such as, without limitation, a browser toolbar or other "plug-in"; a stand-alone application that interfaces with the browser; by running browser executable scripts, such as, without limitation, those written in JavaScript or VBScript; by the browser running object code, such as, without limitation, that written in Flash or Java, or the like. In some embodiments, the appropriate functionality may be integrated into a browser.

As the user plays content in the browser, information is collected about the content and is stored in a database. By monitoring all media-related interactions made by the user within the browser, the collected content information can encompass information from a wide range of sources. User-specific media profile data is then determined based on the collected information and such user media profile data is made available to third parties. The user media profile data can be used, for example, for social networking purposes, and may also be used to drive advertisements or other content to the user and to identify and make available to the user content that may be of interest to the user.

It is to be understood that both the foregoing general description and the following detailed description are exemplary and explanatory and are intended to provide further explanation of the disclosed media toolbar and aggregated/distributed media ecosystem.

Some embodiments comprise a method, comprising collecting media consumption information from a plurality of media players installed on a computing device; monitoring media consumed by a user via a network browsing application installed on the computing device; aggregating the collected media consumption information and the monitored media consumption information; transmitting the aggregated media consumption information to a server; receiving from the server media recommendations based on the aggregated media consumption information; and, displaying the media recommendations to the user. Some embodiments may further comprise presenting a user interface element in the network browsing application, the user interface element allowing a user to control a plurality of media player applications installed on the computer, thereby controlling playback of media consumed via the network browsing application. In some embodiments, the method may further comprise altering a display region of the network browsing application such that the user interface element is presented therein. In some embodiments, the method further comprises displaying the media recommendations to the user via the network browsing application. The aggregated information may comprise a variety of information including, without limitation, information determined from metadata associated with the media and/or by disambiguation of a uniform resource locator or other pointer to the media, information obtained by disambiguation of one or more browser interpretable documents, ratings information provided by the user, a comment about the media provided by the user, at least a partial history of the media played, and the like, as well as a request to add the media to a list of media associated with the user, such as, without limitation, one or more playlists, or one or more lists of favorite songs, movies, artists, commercials, or the like.

In some embodiments, the method may further comprise monitoring browser interpretable documents viewed by the user to determine when such documents comprise a playlist; and allowing the user to store the playlist as part of the aggregated information. In some embodiments, the method may further comprise receiving from a server an advertisement, or a pointer thereto, to be displayed to the user, and displaying the advertisement to the user. In some embodiments, the media consumption information is collected, and the monitoring of the media consumed via the network browsing application occurs, only after the user has consented to such collection.

Some embodiments comprise a method comprising receiving user credential information from a first user; authenticating the received user credentials against a server; receiving, in a first network browsing application, a request to view information from a web server; retrieving media profile information for a second user, the second user associated with the first user, the media profile information comprising information about media consumed by the second user via a plurality of media player applications and information about media consumed by the second user via a second network browsing application; and, displaying the retrieved media profile information. In some embodiments, the retrieved media profile information may be displayed as part of the information from the web server, and/or from a server other than the web server. In some embodiments, the media profile information comprises a history of media consumed by the second user. The media profile information may comprise, without limitation, at least a subset of the media receiving the highest ratings by the second user, at least a subset of the media most frequently consumed by the second user, at least a subset of the media most recently consumed by the second user, at least one playlist, the media currently being consumed by the second user, and the like. In some embodiments, the instructions for retrieving media profile information for the second user comprising a portion of the information received from the web server. In some embodiments, the media profile information for the second user is retrievable only after the second user has indicated that the first user is allowed to access such information.

Some embodiments comprise a system, comprising a module for receiving from a network browsing application information about media consumed on the computing device on which the network browsing application is running, the media consumption information comprising media consumption information from the network browsing application and from a plurality of media player applications; a module for storing the received media consumption information in a database; a module for receiving from a user a user identifier; a module for associating the received media consumption information with the received user identifier and storing the association in the database; a module for determining media profile information for the user associated with the user identifier based on the media consumption information stored in the database; and, a module for identifying at least one media item likely to be of interest to the user based on the determined media profile information and transmitting the identified at least one media, or a pointer thereto, to the network browsing application for display to the user. In some embodiments, the media information comprises a history of media consumed on the computing device. Some embodiments may further comprise module for receiving at least one playlist from the network browsing application and storing the at least one playlist in the database and for transmitting at least a portion of the at least one playlist to the network browsing application in response to a user request therefor. In some embodiments, the media consumption information comprises information from metadata associated with the media, information obtained by disambiguating a uniform resource locator associated with the media, information comprising information obtained by disambiguating at least a portion of a browser interpretable document comprising media or a pointer to the media, or the like. Some embodiments further comprise a module for identifying an advertisement likely to be of interest to the user, the identification based, at least in part, on the media profile information associated with the user, and for transmitting the advertisement, or a pointer thereto, to the network browsing application.

Some embodiments comprise a system comprising a module for establishing communications with, and receiving media consumption information from, an application running on a user computing device, the application collecting media consumption information from a plurality of media players installed on the user computing device and collecting media consumption information from a network browsing application; a module for storing the received media consumption information in a database; a module for receiving a user identifier from the application running on the user computing device; a module for associating the received media consumption information with the received user identifier and storing the association in a database; a module for determining media profile information for the user associated with the user identifier, based at least in part on the media consumption information stored in the database; and, a module for publishing the media profile information such that at least a subset of the media profile information is accessible to other users. Some embodiments further comprise a module for incorporating the profile data into a network browsing application interpretable document such that other users can view the profile data. The profile data may comprising at least one of the current media being played, the most popular media for the user over a determined period, and the last five media played. In some embodiments, the collected information comprising ratings information, a comment about the media, a history of the media played, and the like. In some embodiments, the application runs in a network browsing application. In some embodiments the system further comprises a module for receiving a playlist from the application and storing the playlist as part of the collected information associated with the user, the playlist being made available as part of the profile data. In some embodiments, the profile data is made available to other users only after consent is received from the user.

Some embodiments comprise computer readable media having computer-readable instructions stored thereon, the computer-readable instructions, when executed by a computer, comprising collecting information about media consumed by a user via a plurality of media player applications installed on a computer; collecting information about media consumed by the user via a network browsing application; transmitting the collected information to a server; receiving from the server media recommendations based on the collected information; and, displaying the media recommendations to the user. In some embodiments, the computer readable media further comprises presenting a user interface element in the network browsing application, the user interface element allowing a user to control a plurality of media player applications installed on the computer, thereby controlling playback of the media consumed via the network browsing application. In some embodiments, the computer readable media further comprises displaying the media recommendations to the user via the network browsing application.

BRIEF DESCRIPTION OF THE DRAWINGS

The accompanying drawings, which are included to provide a further understanding of the disclosed media toolbar and aggregated/distributed media ecosystem and are incorporated in and constitute a part of this specification, illustrate various embodiments and, together with the description, serve to explain the principles of at least one embodiment of the disclosed media toolbar and aggregated/distributed media ecosystem.

In the drawings.

DETAILED DESCRIPTION

Figure 1:
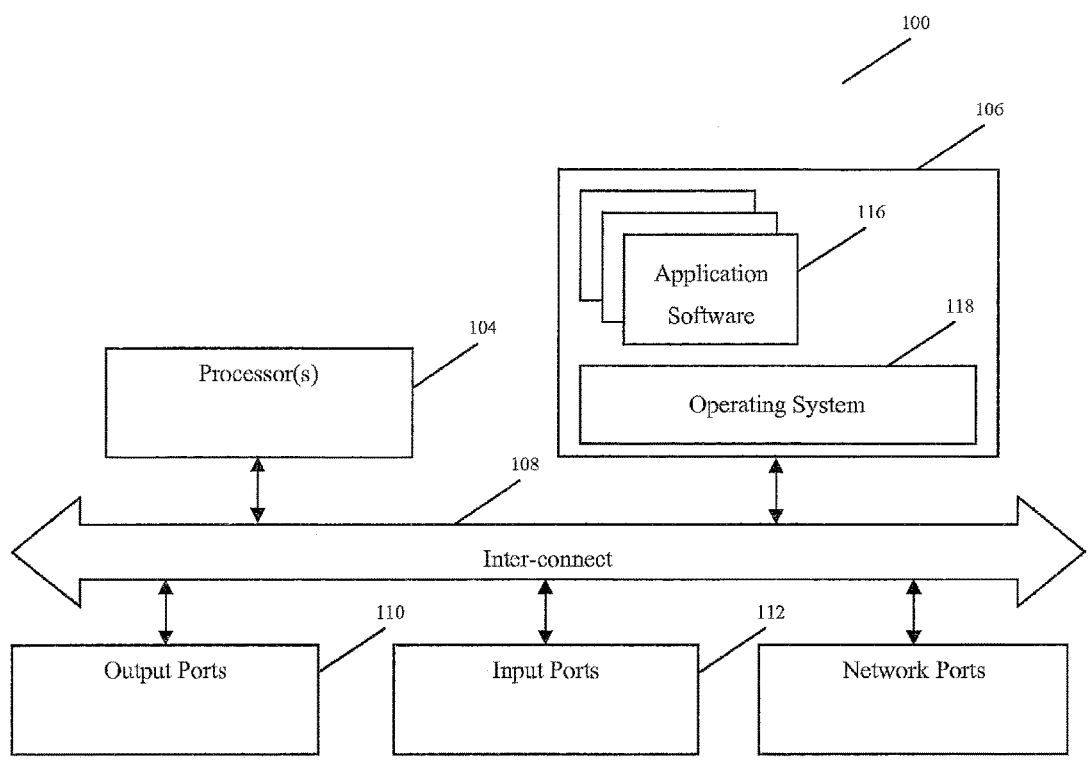
FIG. 1 is a block diagram of a traditional computing device.

Reference will now be made in detail to embodiments of the disclosed media toolbar and aggregated/distributed media ecosystem, examples of which are illustrated in the accompanying drawings. The disclosed media toolbar and aggregated/distributed media ecosystem facilitates monitoring user interactions with, and discovering the identity of, disaggregated media as the media is accessed, played, or otherwise "consumed" by a user. With the advent of the Internet, users are able to access content (including, without limitation, music, videos, text, images, or other media) from more and more sites across the Internet, and on their own computer. For example, to listen to music, a user might visit a variety of music blogs, and also listen to music provided by the Yahoo! Music service provided by Yahoo! Inc. of Sunnyvale, Calif.; the Pandora system published by Pandora Media, Inc. of Oakton, Calif.; iTunes, published by Apple Computer, Inc. of Cupertino, Calif.; and the Rhapsody service, provided by RealNetworks, Inc. of San Francisco, Calif.. The same user may also view videos or other media provided by the Yahoo! Video service provided by Yahoo! Inc.;. the YouTube service provided by YouTube, Inc. of San Bruno, Calif.; and the CNN Video service provided by Turner Broadcasting System, Inc. of Atlanta, Ga.. The instant system spans these and other media sources, recommending other material the user would likely enjoy and allowing the user to control and create playlists from this media.

In some embodiments, the disclosed media toolbar and aggregated/distributed media ecosystem comprises a browser-based plug-in that interfaces with and controls a plurality of media players and online properties, including, with the user's permission, collecting media play behavior, ratings, comments, and the like. Based on a variety of factors including, without limitation, collected play and ratings data, the instant system can also customize a homepage or deliver content (e.g., a displayed portion of one or more portal sites or portal site pages), including, without limitation, recommending relevant media and information to the user. By way of example, without limitation, a user may watch one or more episodes of the television show 24 on iTunes, and the instant system can recommend that the user also visit a corresponding section of a portal site, a fan web site, or the like. Similarly, if the user creates a radio station based on the musical group The Kooks using the Pandora service, the instant system can utilize the radio station data, including feedback obtained from the user, to create a customized music station, playlist, or the like within a service provided by the portal site. Still further, if the user were to watch or read a news story on Barack Obama, the instant system could recommend an appropriate portion of the portal site to the user. In yet another example, user media profile information may be aggregated to determine trends, such as, without limitation, content that is likely to be of interest to users having similar media profiles. By way of example, without limitation, the media profile information may suggest to a user that, given the user's propensity toward music by a Nine Inch Nails, that others with a similar propensity tend to also like music by Filter, and identifying one or more songs by Filter in which the user might be interested; or that those who like movies directed by John Wu tend to also like movies starring Jackie Chan, and recommending one or more such movies.

In addition to suggesting media and/or portions of a portal or other site to the user, the information obtained from media player monitoring may also be used to target advertisements to the user. Such recommendations may be made by way of a dialog box presented to the user when a page is loaded or when the user hovers a pointer or other user interface device over a link to the content, by a notice appearing in a pop-up frame along the edge of the browser display area, in the browser status bar, integrated into the display area next to, above, or below links to the related content, integrated into a search results page, or via other such techniques.

In some embodiments, the instant system can also power personalized World. Wide Web ("web") applets, browser interpretable code segments, widgets, or the like that can be embedded on any web property (e.g., those of social networking sites like MySpace and Facebook, as well as user blogs and other web sites) to automatically show a user's favorite artists, songs, albums, videos, and the like, as well as the current media being played, or most recent media played by the user or the like, when a visitor visits that web site.

For the purposes of this disclosure, a computing device (also referred to herein as a "computer") includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

For the purposes of this disclosure a module is a software, hardware, or firmware (or combinations thereof), a system, process or functionality, or component thereof, that performs or facilitates the processes, features, and/or functions described herein (with or without human interaction or augmentation). A module can include sub-modules.

For the purposes of this disclosure an engine is a software, hardware, or firmware (or combinations thereof) system, process or functionality that performs or facilitates the processes, features, and/or functions described herein (with or without human interaction or augmentation). A search engine, by way of non-limiting example, can accept search criteria, such as search terms and dates of publication, query a network for web pages meeting the search criteria, and return query results. An engine could, for example, include modules, or an engine could be a module or component of a larger system.

For the purposes of this disclosure, a server comprises software and/or hardware running on one or more computing devices which receives information requests from other servers, user computers, or other computing devices, and responds to such requests. A number of program modules and data files may be stored on a computer readable medium of the server. Such program modules may comprise instructions for performing one or more tasks. The program modules and data files may include an operating system suitable for controlling the operation of a networked server computer, such as the WINDOWS VISTA, WINDOWS XP, or WINDOWS 2003 operating systems published by Microsoft Corporation of Redmond, Washington, the Ubuntu operating system distributed by Canonical Ldt. of Douglas, Isle of Mann.

For the purposes of this disclosure an ad server is software, hardware, or firmware (or combinations thereof) capable of searching a database or other repository of advertisements to find one or more ads to serve on web pages, and capable of storing data. An ad server may be a single server or a group of servers acting together. An ad server selects ads to serve based on algorithms meant to direct to the user those advertisements which are most relevant to the user. In some embodiments, the ad server functionality may be augmented to select media or other content which is most relevant, or likely to be of interest, to the user. Such ad servers may be implemented by an advertiser, an ad serving company (e.g. YAHOO!, GOOGLE), an ad exchange, an ad network, content provider, or the like.

For the purposes of this disclosure a media server is software, hardware, or firmware (or combinations thereof) that facilitates access to media or other content. A media server may be a single server or a group of servers acting together. In some embodiments, the content may be stored in a database or other repository. The media server can provide access to the content as a file, media stream, or by other such means. The media server may provide a set of browser interpretable instructions, or a browser interpretable document (referred to collectively herein as a "browser interpretable document", for clarity), which facilitates access to the media accessible therefrom. In some embodiments, the browser interpretable document may incorporate instructions for presentation of the media by the browser interpretable document or a separate browser interpretable document. In other embodiments, the browser interpretable document may incorporate instructions for presenting the media as part of a stand-alone player.

For the purposes of this disclosure the terms "network browsing application" and "browser" are intended to be synonymous and are intended to encompass application software, running on a computing device, which is at least capable of interpreting information stored using Hypertext Markup Language ("HTML"), Extensible Markup Language ("XML"), or other language derived from the Standardized Generalized Markup Language. Examples of such browsers include, but are not limited to, Internet Explorer distributed by Microsoft Corporation; Firefox distributed by the Mozilla Foundation of Mountain View, Calif.; Camino distributed by the Camino Project; and Opera distributed by Apple Computer, Inc. of Cupertino, Calif.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to store the desired information and which can be accessed by the computer.

FIG. 1 is a block diagram illustrating components of an exemplary user computing device 100. In some embodiments, user computing device 100 comprises an interconnect 108 (e.g., bus, system core logic, or the like), which facilitates communication between the various components of user computing device 100 such as, without limitation, processor(s) 104 and memory 106. Furthermore, interconnect 108 can allow processor 104 and/or memory 106 to communicate with peripheral devices, including those connected via input ports 112 and output ports 110. input ports 112 and output ports 110 can communicate with I/O devices such as mice, keyboards, modems, network interfaces, printers, scanners, video cameras and other devices. In addition, output port 110 can further communicate with a display.

Interconnect 108 may also comprise one or more buses connected to one another through various bridges, controllers and/or adapters. In some embodiments, input ports 112 and output ports 110 can include a USB (Universal Serial Bus) adapter for controlling USB peripherals, and/or an IEEE-1394 bus adapter for controlling IEEE-1394 peripherals. Inter-connect 108 can also include one or more network ports 114, through which the user computing device can be communicatively coupled with a communication network.

In some embodiments, memory 106 may include ROM (Read Only Memory), and volatile RAM (Random Access Memory) and non-volatile memory, such as hard drive, flash memory, computer-readable media, or the like. Volatile RAM is typically implemented as dynamic RAM (DRAM), which requires continuous power to refresh or maintain the data in the memory. Non-volatile memory is typically a magnetic hard drive, flash memory, a magneto-optical drive, or an optical drive (e.g., a DVD RAM), or other type of memory system which maintains data even after power is removed from the system. Computer-readable media can include, without limitation, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), or the like.

In some embodiments, memory 106 can be a local device coupled directly to the other components or modules in the data processing system. A non-volatile memory that is remote from the system, such as a network storage device coupled to the data processing system through a network interface such as a modem or Ethernet interface, can also be used.

In some embodiments, routines executed to implement one or more embodiments may be implemented as part of an operating system 118 or a specific application, component, program, object, module or sequence of instructions, collectively referred to herein as application software 116. Application software 116 typically comprises one or more instruction sets that can be executed by microprocessor 104 to perform operations necessary to execute elements involving the various aspects of the methods and systems described herein.

Figure 2:
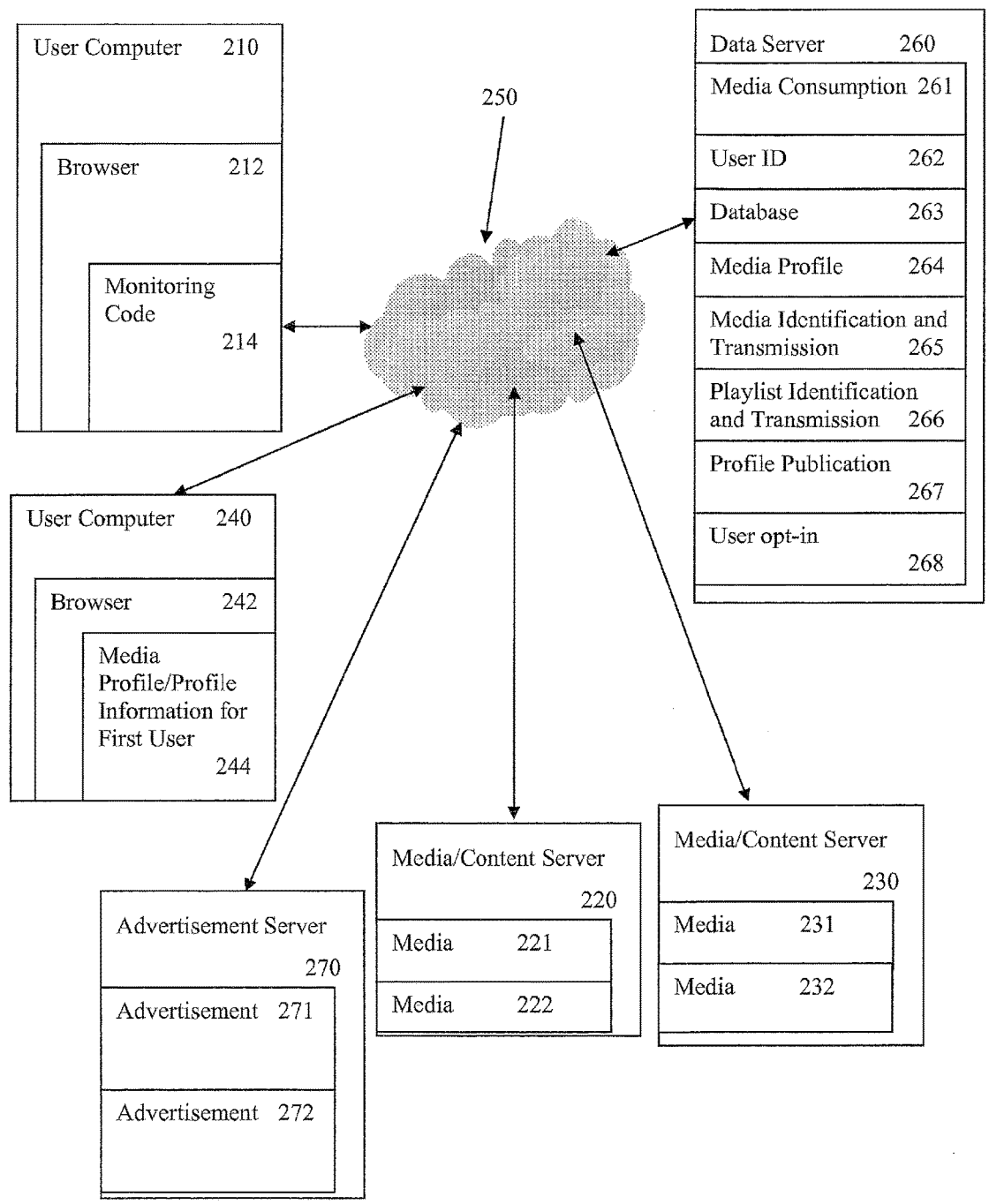
FIG. 2 is a block diagram of a network architecture through which the disclosed media toolbar and aggregated/distributed media ecosystem can be implemented.

FIG. 2 illustrates a network architecture supporting the disclosed media toolbar and aggregated/distributed media ecosystem. In FIG. 2, User Computer 210 and User Computer 240 comprise user computing devices analogous to those describe above with respect to FIG. 1.

In FIG. 2, User Computing Device 210 is operated by a first user. The first user causes an instance of browser 212 to be run by the computing device, and begins browsing one or more network resources available over communications network 250. Such a communications network may comprise a proprietary network, such as an intranet, a public network, a virtual private network, or combinations thereof. Examples of such communications networks include, without limitation, high-speed wired and wireless communications employing the 802.11 series of standards published by the Institute of Electrical and Electronics Engineers ("IEEE"), cellular telephony, digital data encoded by modulating an analog telephone carrier signal using a modem, or the like. In addition, some or all parts of communications taking place over the communications network may be secured using a variety of secure communications methods including, without limitation, Virtual Private Networking ("VPN"), Secure Sockets Layer ("SSL"), the Advanced Encryption Standard ("AES"), Triple Data Encryption Standard ("3DES"), or the like.

In some embodiments, the functionality associated with Media/Content Servers 220 and 230 may be provided by multiple servers to scale the system architecture to meet demand, Furthermore, individual components of Media/Content Server 220, e.g., Media 221, Media 222, Media 231, and/or Media 232 may be provided by a separate server or group of servers.

In some embodiments, network 250 may be an intranet (a private version of the Internet). An intranet is a computer network allowing data transfer between computing devices on the network. Such a network may comprise personal computers, mainframes, servers, network-enabled hard drives, and any other computing device capable of connecting to other computing devices via an intranet. An intranet may use the same communication protocol suite as the Internet, or alternative communications protocols. With respect to the protocols used on the Internet, two of the more important protocols in the suite are the transmission control protocol ("TCP"), the Internet protocol ("IP"), and the Hypertext Transfer Protocol ("HTTP").

In some embodiments, monitoring code 214 comprises a browser helper object, plug-in, or the like that adds functionality to browser 212. In some embodiments, monitoring code 214 comprises browser interpretable instructions which enhance the functionality of browser 212. In some embodiments, monitoring code 214 comprises instructions that are embodied within browser 212. In some embodiments, monitoring code 214 comprises instructions tangibly stored on computer readable media which allow a user to control a plurality of media player applications installed on user computer 210, as well as media players embedded in some web pages. This gives browser 212 the ability to play and/or control the playback of media files or other media items in a variety of formats, including proprietary formats such as the QuickTime format published by Apple Computer, Inc. of Cupertino, Calif. and the Flash format published by Adobe Systems Incorporated of San Jose, Calif.. By allowing browser 212 to play such a wide variety of media file formats, the instant system can encourage users to play media through browser 212, rather than switching between separate, stand-alone applications depending on, for example, the format in which the content has been encoded.

In some embodiments, monitoring code 214 may also interface with media player applications, such as, without limitation, Yahoo! Music Jukebox, distributed by Yahoo! Inc.; Windows Media Player, distributed by Microsoft Corporation; iTunes, distributed by Apple Computer, Inc., and the like, to obtain information about the media files consumed therethrough. Thus, for example, a user may use Yahoo! Music Jukebox to access songs or other content from the Yahoo! Music Unlimited catalog, and may use iTunes to access video or other content available through iTunes. In some embodiments, when monitoring code 214 launches, monitoring code 214 can obtain from each media player installed on the computing device, or a subset thereof, the list of media consumed using that media player.

Where supported by a particular media player, monitoring code 214 may limit the most recently accessed media query to that which was accessed after the last query made by monitoring code 214. In some embodiments, where a media player does not support such query limitations, monitoring code 214 may cause the media player to load a specific media file, thereby creating a marker in the most recently accessed media list. By way of example, without limitation, a 0.1 second long sequence of silence may be stored as a digital file using the Motion Picture Entertainment Group Layer 3 ("MP3") compression algorithm, and this digital file may be renamed with the current date and time by monitoring code 214. Monitoring code 214 can then obtain the list of most recently accessed media from a particular media player and, once the list is received, instruct the media player to play the 0.1 second long MP3 file. This creates a marker in the most recently accessed media list for that media player, by which monitoring code 214 can identify a precise location in the list for future reference. In some embodiments, the previous list contents may be subtracted from or otherwise compared against the previous list contents, thereby readily identifying the most recently accessed content.

In some embodiments, monitoring code 214 can monitor content presented via the browser and associate the content with a user. To accomplish this, monitoring code 214 can request that a user provide credentials, such as, without limitation, a username and password, biometric identifier, or the like, when monitoring code 214 first loads or at other appropriate times. Once the user is properly authenticated, monitoring code 214 may store the credential information, or may employ alternative authentication means, thereby obviating the need for the user to enter the authentication each time monitoring code 214 is loaded. Monitoring code 214 may also poll user opt-in module 268 of data server 260 to determine whether the user has authorized the collection and/or publication of media consumption information, and may disable some or all features described herein based on the information received from opt-in module 268.

In some embodiments, when monitoring code 214 is active within browser 212, monitoring code 214 can parse each browser interpretable document, such as, without limitation, a file written in the Hypertext Markup Language ("HTML"), eXtensible Markup Language ("XML"), or the like is loaded by the browser to identify any media, or pointers to media, contained therein. This can be done seamlessly, without requiring input from the user, and monitoring code 214 can modify the contents of the browser display area to reflect recommendations or other such information from the instant system.

Such recommendations can be generated, at least in part, by media identification and transmission module 265 of data server 260, based on a user media profile 264 which is generated based on information received by media consumption module 261. In some embodiments, monitoring code 214 can aggregate media consumption information from the various sources described above and supply the aggregated information to media consumption module 261, which in turn is stored in database 263. The user credentials or other such user identification information can be transmitted from monitoring code 214 to user ID module 262, thereby allowing data server 260 to associate the aggregated media consumption information with the user. In some embodiments, the aggregated media consumption information may comprise the media most frequently consumed by the user, the media highest rated by the user, the media currently being consumed by the user, and the like. With such information available, data server 260 can generate media profile 264 for the user.

In some embodiments, advertisement server 270 may also supply additional content, or links thereto, based on user media profile 264. By way of example, without limitation, advertisement 271 may represent an offer to purchase a DVD of the user's favorite television show, and advertisement 272 may represent an offer to purchase a new MP3 by one of the user's top ten favorite artists. This can allow for more targeted marketing of content and services of interest to the user, which can enhance the efficiency of such advertisements.

In some embodiments, monitoring code 214 may also allow the user to add links to the user's favorite media to user media profile 264. By way of example, without limitation, a user might enjoy the London Philharmonic's performance of a particular work, and user profile 264 can be supplemented to include a Uniform Resource Locator ("URL"), the unique ID of corresponding content in a proprietary or public database, or other pointer to the file. In some embodiments, playlist identification and transmission module 266 may also allow a user to store the linked content individually or as one or more playlists, and to import playlists created by other users. By way of example, without limitation, a user visiting a music blog can import the blog as a playlist to his or her profile for later consumption.

Media identification and transmission module 265 may use media profile 264 as a basis for selecting and/or generating content for the user, and profile publication module 267 may use media profile 264 as a basis for publishing information from media profile 264 to users. By way of example, without limitation, when a second user, using user computer 240, visits a social networking site for the first user, the social networking site's server may provide, as part of one or more browser interpretable documents served therefrom, information derived from user media profile 264 and/or profile publication module 267. Such information may include, without limitation, the media currently being played by browser 212 or another media player installed on user computer 210, the last five content consumed by the first user, and the content most frequently consumed by the first user. Such information may be loaded as static information when the page is served, or may be incorporated into one or more dynamic applets, widgets, or the like. The incorporation of such information in a dynamic page may be implemented using one or more modules comprising appropriate instructions in JavaScript or other scripting language which periodically poll data server 260. Such implementations can allow the user media profile data to be updated without requiring that the entire page be requested from the server. In some embodiments, the instructions may allow data server 260 to "push" appropriate information to browser 242. By way of example, without limitation, monitoring code 214 may incorporate such instructions therein, and may be incorporated into or otherwise associated with browser 242.

In some embodiments, monitoring code 214 and/or data server 260 may also incorporate one or more application programmer interfaces ("API's"). Such API's can allow third party software developers to access user media profile 264 or other personalized information from data server 260 and to incorporate such information into other software or services. Similarly, the information from data server 260 may be directly available via published API's, thereby allowing third party developers to leverage the information contained therein without requiring that monitoring code 214 be installed on the user computer. By way of example, without limitation, a user may have a profile on MySpace, but have friends who have profiles on FaceBook, various blog sites, and Yahoo!. MySpace may allow the user to easily incorporate an appropriate set of commands into the user's MySpace profile web page, such that when the user visits his profile web page, the MySpace homepage, or the like, the user can see a list of the content his friends are currently consuming.

Figure 3:
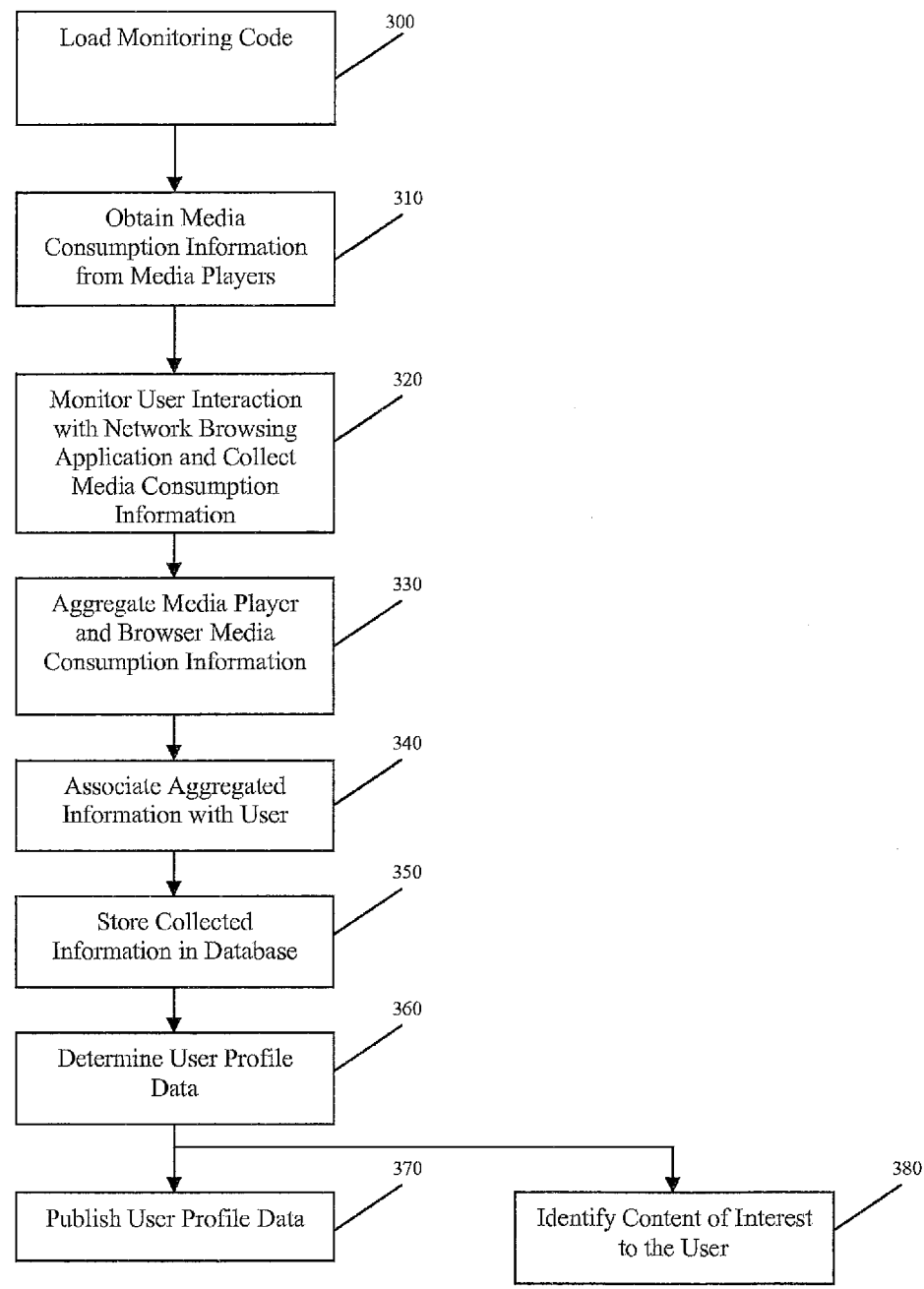
FIG. 3 is a flow chart illustrating a method of implementing the disclosed media toolbar and aggregated/distributed media ecosystem.

FIG. 3 is a flowchart illustrating an exemplary method by which the instant media toolbar and aggregated/distributed media ecosystem can be implemented. In block 300, the monitoring code is loaded by the browser. As described above, the monitoring code may be integrated into the browser, or may be added to the browser by way of a browser plug-in, ActiveX control, through commands contained in one or more browser interpretable documents, or the like, and allows the instant system to easily monitor the consumption of content.

In some embodiments, the monitoring code can obtain media consumption from a plurality of media players installed on the computing device (block 310). This can be accomplished, for example, by asking the operating system to enumerate the set of media players installed on the system, and/or by searching for known media players on the computing device. Appropriate instructions can then be retrieved from data server 260 whereby the monitoring code can interface with and/or control the media players on the device. In some embodiments, the playlists and other information stored as part of the user's media profile may be displayable in one or more web pages or other browser interpretable documents, and the user can use a web browser and the monitoring code to play back the media through a single, convenient interface. In some embodiments, the media player controls may be capable of controlling not only stand-alone media player applications installed on the device, but also those rendered by a browser, such as those written in Java, Flash, or other programming/scripting languages. In some embodiments, rather than directly controlling the browser rendered media player applications, the monitoring code may simply record the user's interactions with the browser rendered media player application. By facilitating such control, the monitoring code can easily monitor the content played by the various media player applications.

In some embodiments, the monitoring code monitors user interactions with the browser and collects media consumption information (block 320). In block 330, the monitoring code aggregates media consumption information collected from the various media players installed on the device and media consumption information from the browser. Such media consumption information may comprise information collected from metadata associated with or stored in the media being consumed. By way of example, without limitation, MP3 files allow metadata to be stored therein, and the monitoring code may read such metadata information to obtain the media information. In some embodiments, the metadata may be directly associated with the content by way of one or more markup tags in an HTML or XML document, or may be contextually derived (e.g., using disambiguation or other such techniques) from neighboring content in an HTML or XML document. By way of example, without limitation, a user might load a browser interpretable document containing the HTML code illustrated in Table 1. When the user clicks on or otherwise interacts with the link for "song1.mp3" (indicated by the a href="http://music.yahoo.com/song1.mp3"), the monitoring code can load any metadata associated with that file directly from the MP3 file. By contrast, the "WAY" file format does not support the inclusion of metadata in the file. Thus, when the user clicks on or otherwise interacts with the link corresponding to "down by the river.wav", the monitoring code must pull the metadata from other sources. This can be accomplished, for example, by searching neighboring terms within the HTML document against one or more specialized or general dictionaries, which allows the monitoring code to identify Neil Young as an artist and, given the structure of the code snippet and the proximity of Neil Young to the link for the WAV file, suggests that Neil Young is the likely artist to be associated with the file. Similarly, the file name can be parsed and searched against a dictionary to infer additional information, such as title, artist, album, or the like. In this case, the monitoring code can identify "Down by the River" as the title of a song by Neil Young, thereby increasing the likelihood that link selected by the user corresponds to Neil Young's "Down by the River".

TABLE 1

```
<HTML>
    <BODY>
        <a
    href="http://music.yahoo.com/song1.mp3">This is
    one of my favorite songs!</a><br>
        <a href="http://www.foo.com/down by the
    river.wav">But those guys can't hold a candle to
    Neil Young!</a><br>
    </BODY>
</HTML>
```

In block 340, the information collected by the monitoring code is associated with the user. As described above, in some embodiments the monitoring code may request credentials from the user, thereby facilitating such association. Once such an association has been made, the information is stored in a database (block 350). Any desired user media profile data can then be derived therefrom (block 360), and the user profile information can be published (block 370), used as a basis for identifying and/or directing content of interest to the user (block 380), and for other such purposes.

Figure 4:
FIG. 4 is a screen capture of a traditional browser interpretable document when interpreted by a network browsing application.

FIGS. 4-14 are screen captures illustrating various aspects of the above-described media toolbar and aggregated/distributed media ecosystem. FIG. 4 is a screen capture of a traditional portal web site 400 when a corresponding browser interpretable document is interpreted by a network browsing application.

Figure 5:
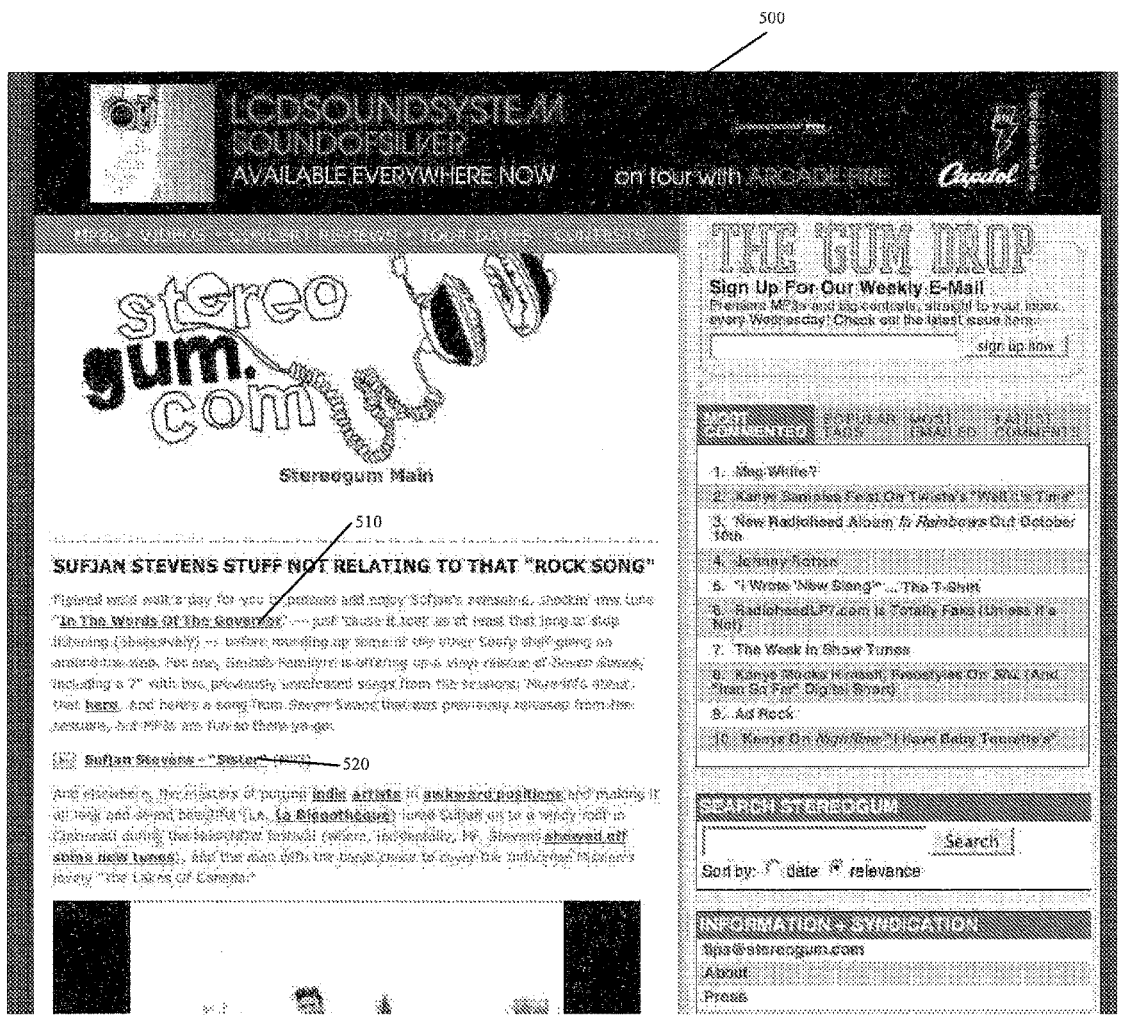
FIG. 5 is a screen capture of a web page with links to media.
Figure 6:
FIG. 6 is a screen capture of a social networking web page.

FIG. 5 is a screen capture of a traditional web page 500 with links 510, 520 to one or more media items, and FIG. 6 is a screen capture of a traditional social networking web page 600 comprising links 610, 620, 630, 640, and 650 to media items. When a user of the instant system and methods visits such a page, the monitoring code may parse the browser interpretable document to identify the media file links contained therein, thereby allowing any necessary disambiguation or other processing to occur while the user is reading the contents of the page, which can in turn make for a smoother and more comfortable browsing experience for the user. In some embodiments, the identification of media file links may be limited to those whose playback is initiated by the user via the monitoring code. In some embodiments, disambiguation occurs only after the media file is read to first determine if there is any metadata associated therewith.

Figure 7:
FIG. 7 is a screen capture of a web page through which locally stored and remotely available media can be accessed.

FIG. 7 is a screen capture of a web page 700 through which locally stored and remotely available media can be accessed. When the user initiates the playback or other consumption of media, such as by clicking on link 610 of FIG. 6, the media information is stored in the user media profile. This media profile data can then be used by a web page such as that illustrated in FIG. 7 to display the most recently played media to the user, thereby allowing the user to quickly access that media again without having to navigate to the media via the browser. The recently played list may be limited to displaying the five, ten, twenty-five, etc. most recently played media, deleting the oldest entry, as appropriate, to allow newer entries to be added thereto. Through web page 700, the user can also drag content from the recently played list to a "save for later" list, bookmark list, digital "locker", or the like, thereby facilitating access to the content even after it is no longer on the recently played list. Web page 700 can also use the media profile data to generate other information for the user, including, without limitation, the twenty-five most frequently played media, the highest rated media based on feedback from the user, the most recently added media, and the like.

Figure 8:
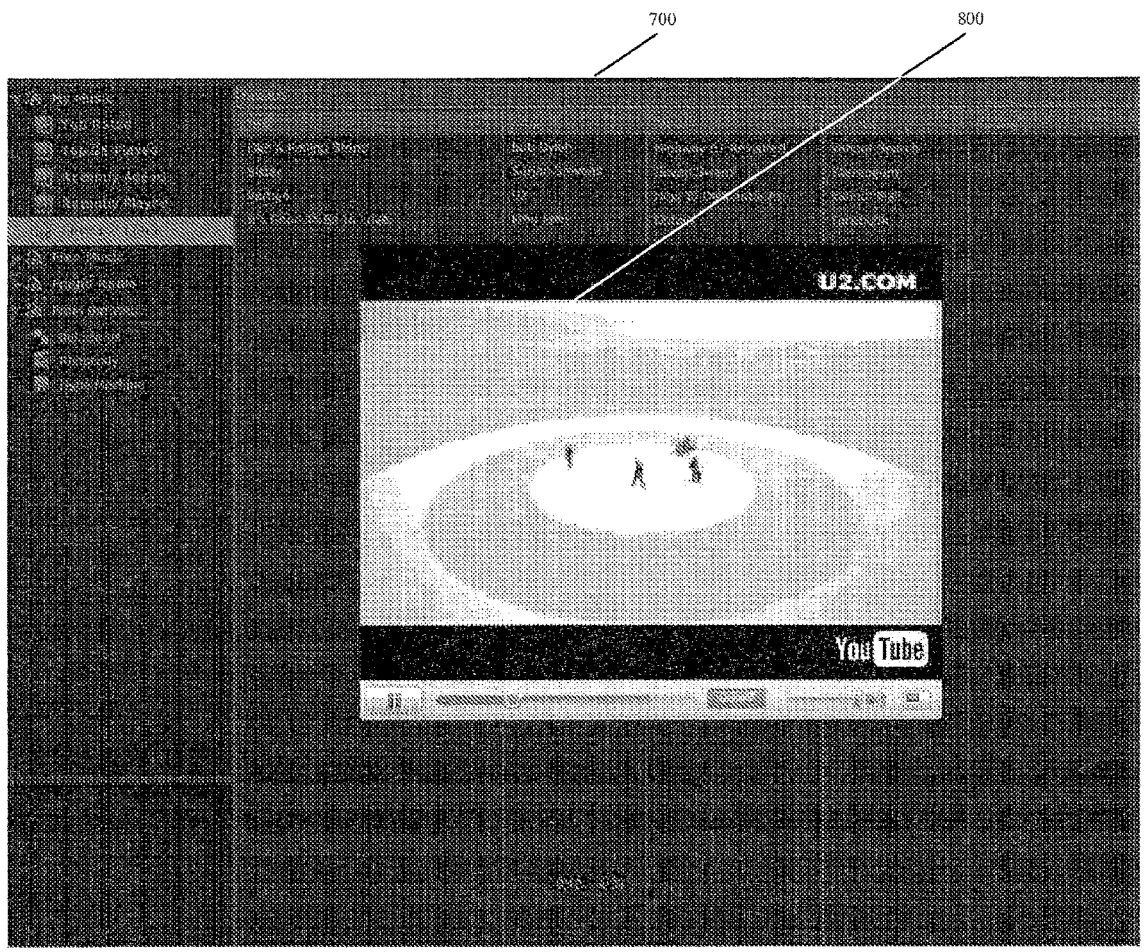
FIG. 8 is a screen capture of the web page of FIG. 7 facilitating the playback of audio/visual media from a third party site.
Figure 9:
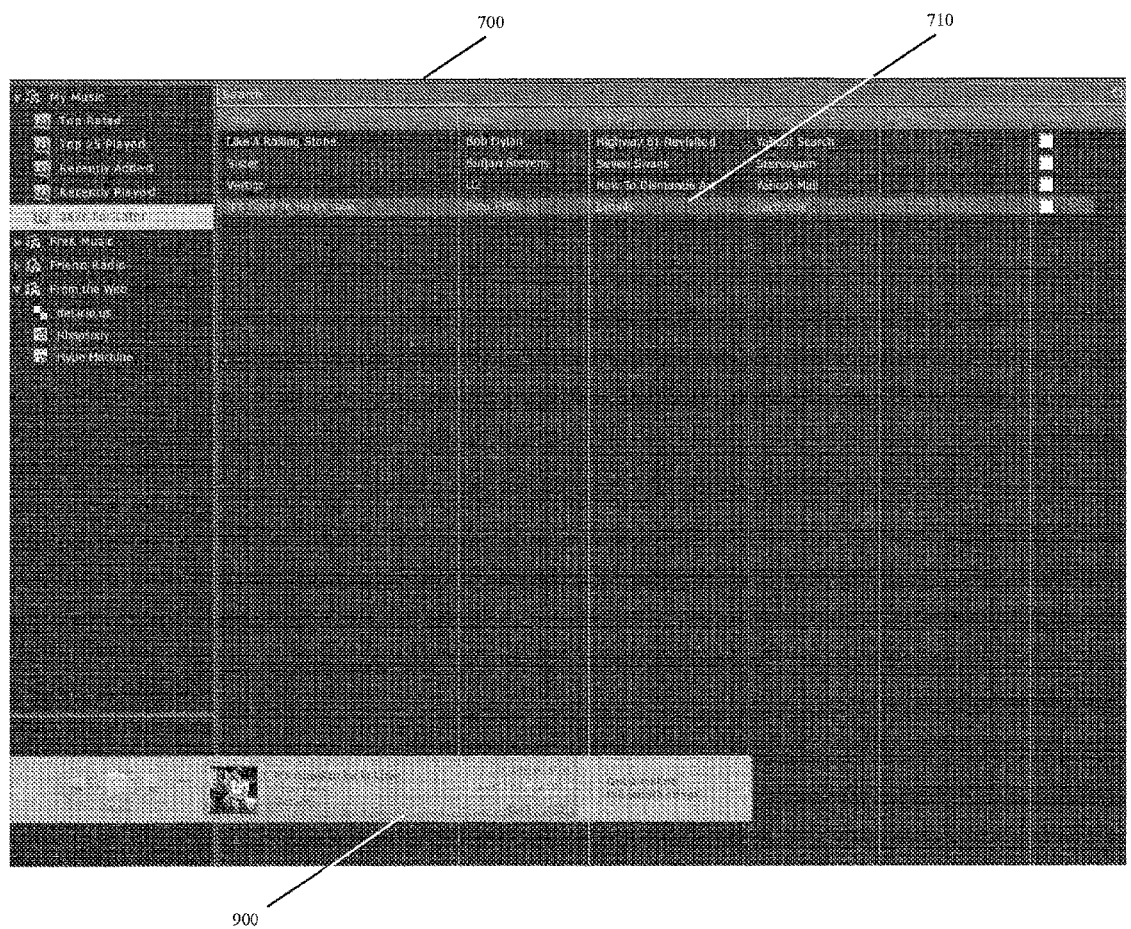
FIG. 9 is a screen capture of the web page of FIG. 7 facilitating the playback of audio media from a third party site.

FIGS. 8 and 9 are screen captures of the web page of FIG. 7 facilitating the playback of media from third party sites. In FIG. 8, video display 800 is displaying content from YouTube, which uses the Flash player content encoding format, the player for which is generated by the browser. In FIG. 9, audio controls 900 facilitate the playback of an audio file stored in a user's FaceBook web page. Because the monitoring code is capable of interfacing with and controlling a plurality of media players, web page 700 can facilitate playback of these various media files regardless of the encoding means employed in their creation or the site on which they are stored. In some embodiments, web page 700 and/or the monitoring code may prompt the user for credentials if such credentials are needed to access particular content from a particular source.

Figure 10:
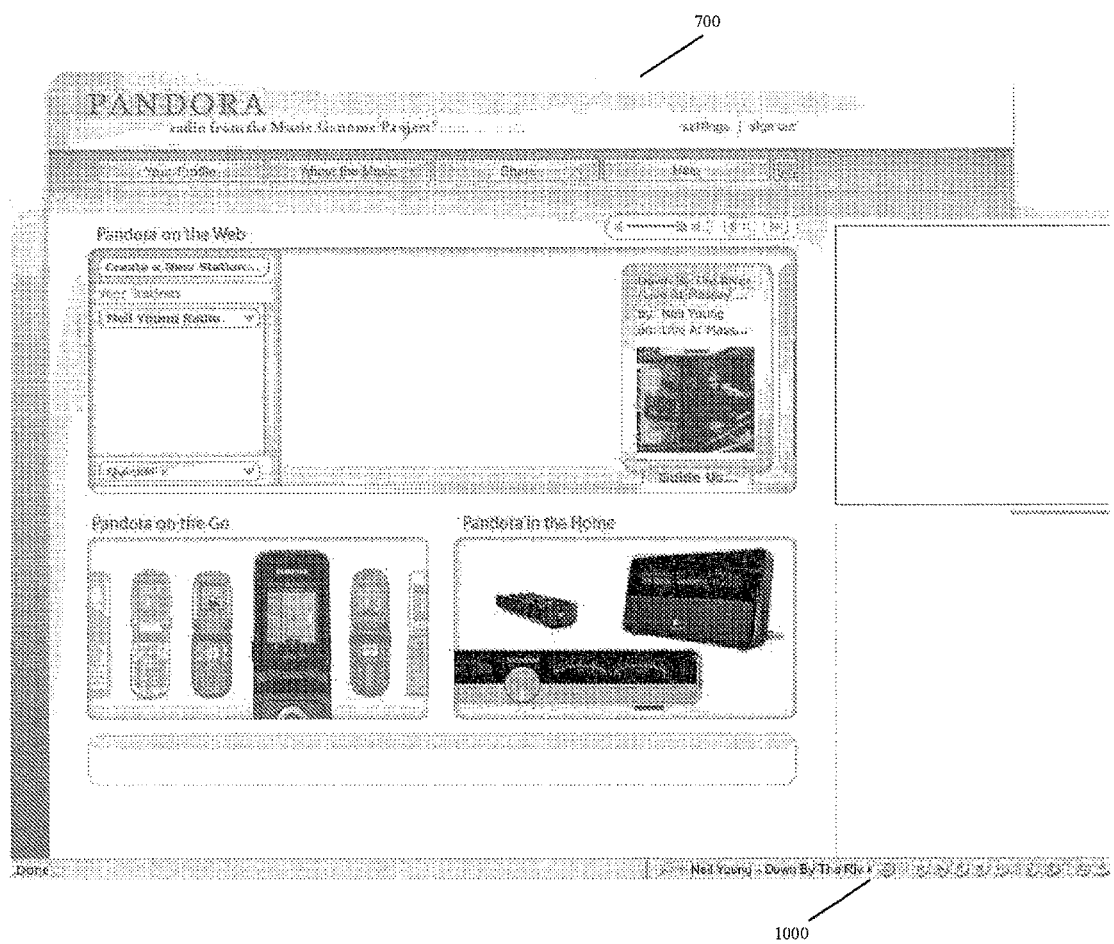
FIG. 10 is a screen capture of an alternative user interface through which the media player functionality can be implemented.

FIG. 10 is a screen capture of an alternative user interface through which the media player functionality can be implemented. In FIG. 10, the monitoring code causes web page 700 to display controls 1000 as part of the status bar across the bottom of the browser window. These controls allow the user to exercise additional control over the content played by the third party content service illustrated in FIG. 10. In some embodiments, the controls may persist in the status bar, and may allow playback of content from the third party content service, even when the user navigates away from the third party content service's web page. In some embodiments, the controls are displayed across all browser windows and tabs, thereby allowing the user to view other web pages while keeping the third party content service's web page open in the background.

Figure 11:
FIG. 11 is a screen capture of a third party application being used to view and interact with media.

FIG. 11 is a screen capture of a third party application being used to view and interact with media from a third party content service. In such an embodiment, the third party application can keep a list of the content consumed by the user. As discussed above, the monitoring code can retrieve this content list and update the user media profile at appropriate times.

Figure 12:
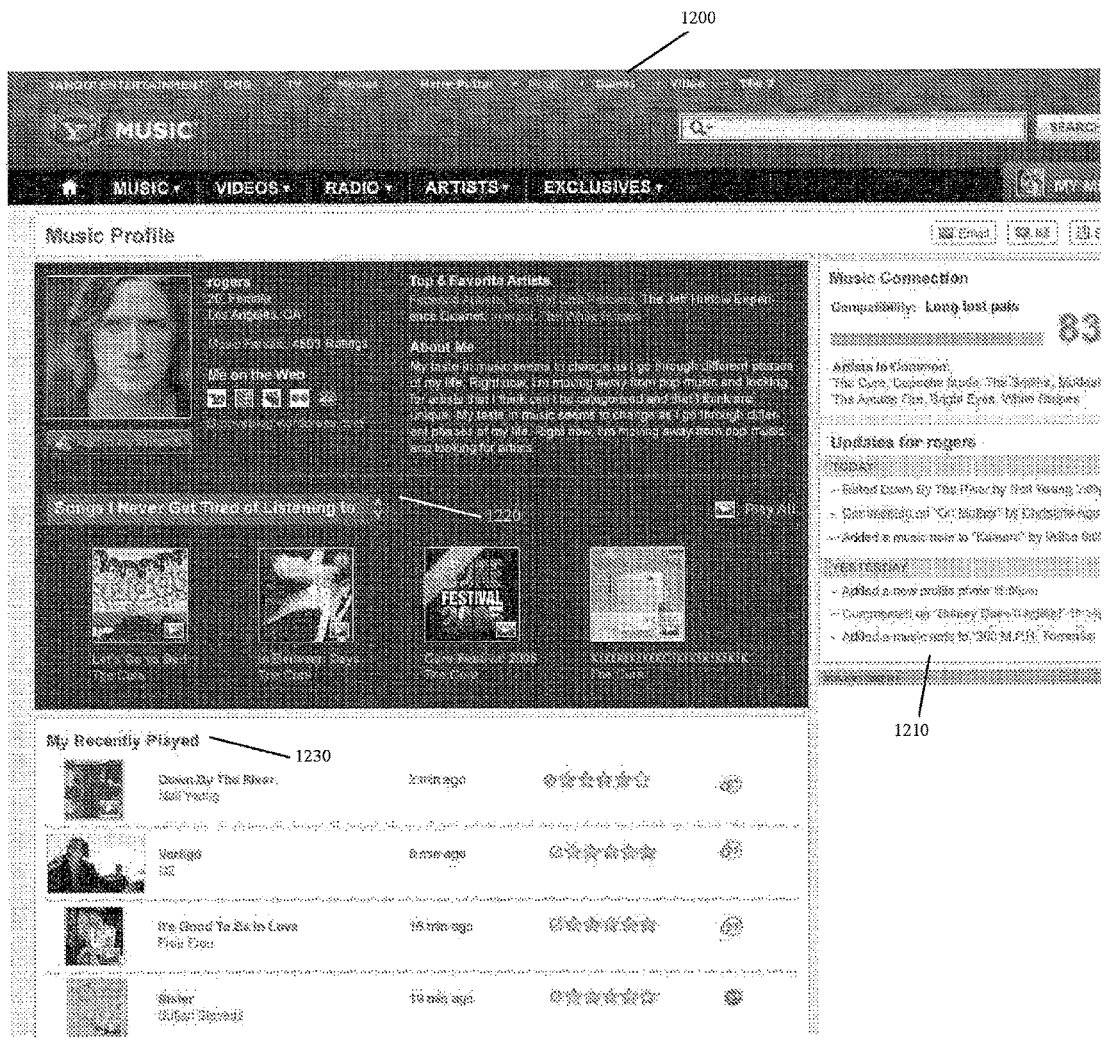
FIG. 12 is a screen capture of an exemplary social networking web page which incorporates media profile data.

FIG. 12 is a screen capture of an exemplary social networking user profile page 1200 which incorporates media profile data 1210, 1220, and 1230. In some embodiments, when a second user visits a first user's social networking profile page, the social networking web site may access the first user's media profile data to generate portions of the user profile page. In some embodiments, links to the first user's media profile data may be provided by the social networking web site, and the second user's browser may obtain the information, thereby offloading the overhead from the server to the second user's browser. By way of example of the types of information that can be displayed, without limitation, a social networking site focusing on music may display the first user's four most frequently played songs in "Songs I Never Get Tired of Listening to" section 1220, and the four most recently played songs or music videos in "My Recently Played" section 1230. Similarly, those music-related actions the user has undertaken, such as, without limitation, entering ratings information about a particular song, entering comments in a blog about a particular song, or the like, may be displayed in an "Updates for . . . " 1210 section.

Figure 13:
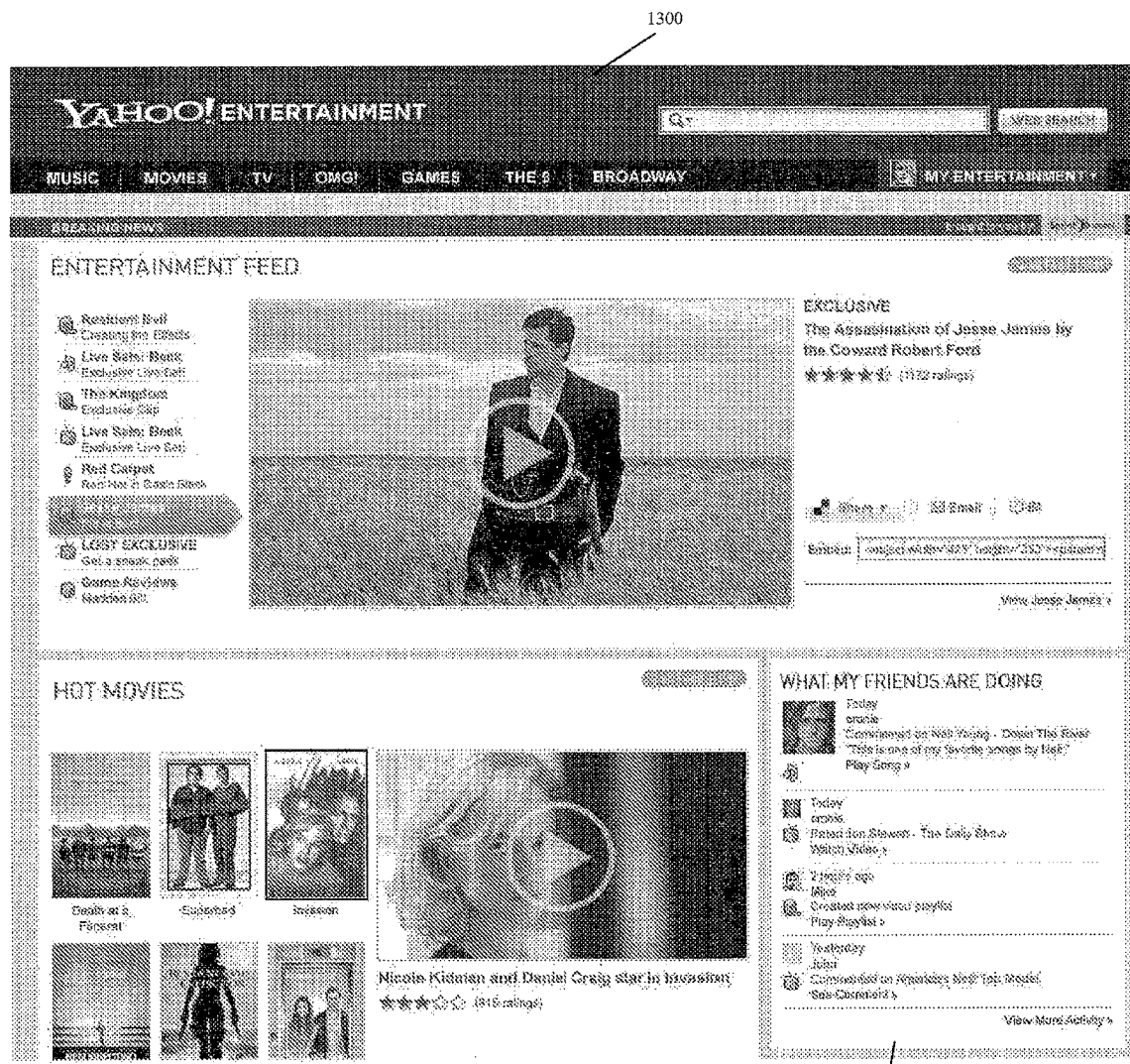
FIG. 13 is a screen capture of an exemplary portal web page which incorporates media profile data.

FIG. 13 is a screen capture of an exemplary portal web page 1300 which incorporates media profile data. In FIG. 13, portal web page 1300 provides traditional, customized portal content to the user, and also provides content derived from media profile data in the form of "What My Friends are Doing" section 1310. In this section, the first user's friends are identified from user profile information (such as, without limitation, the user's friends list or "buddy list" in an instant messaging application; the user's contacts from an E-mail program or cellular telephone; or the like), and recent media profile data for at least a subset of the friends is displayed. By way of example, without limitation, the "What My Friends are Doing" section 1310 of FIG. 13 displays the four most recent actions taken by friends of the user whose personalized portal web page is illustrated.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

Numerous other changes may be made that will readily suggest themselves to those skilled in the art and which are encompassed in the spirit of the invention disclosed and as defined in the appended claims.

What is claimed is:

1. A method comprising:
obtaining, at a server computing device from a user computing device, a history of media consumed at the user computing device, wherein the history of media consumed at the user computing device is collected at least in part via a sequence of instructions comprising a browser helper object executed at the user computing device at least in part in connection with a network browsing application, wherein the history of media consumed at the user computing device identifies media content consumed at the user computing device via the network browsing application and via one or more media players of the user computing device, wherein the browser helper object comprises one or more of a network browsing application toolbar, a network browsing application plug-in, and/or a stand-alone application to interface with the network browsing application;
storing the history of media consumed at the user computing device in a database at the server computing device; and
identifying one or more media items to recommend to a user based, at least in part, on the history of media consumed at the user computing device.

2. The method of claim 1, wherein the one or more media players of the user computing device comprises one or more media players to download and/or stream media content via the Internet.

3. The method of claim 1, further comprising identifying media content most recently consumed at the user computing device via the network browsing application.

4. The method of claim 3, further comprising identifying media content most frequently consumed at the user computing device via the one or more media players of the user computing device.

5. The method of claim 4, further comprising:
communicating between the server computing device and the user computing device the one or more identified media items to recommend to the user, wherein the identifying the one or more media items to recommend to the user is based at least in part on the history of media consumed at the user computing device and the media content most frequently consumed at the user computing device via the network browsing application and via the one or more media players of the user computing device.

6. The method of claim 5, wherein the communicating the one or more identified media items to recommend to the user comprises communicating digital content, wherein the digital content is selected based, at least in part, on the history of media consumed at the user computing device and the media content most recently consumed at the user computing device.

7. A server computing device, comprising:
a processor to obtain, from a user computing device, a history of media consumed at the user computing device, wherein the history of media consumed at the user computing device is collected at least in part via a sequence of instructions comprising a browser helper object to be executed at the user computing device at least in part in connection with a network browsing application, wherein the history of media consumed at the user computing device to identify media content consumed at the user computing device via the network browsing application and via one or more media players of the user computing device, wherein the browser helper object to comprise one or more of a network browsing application toolbar, a network browsing application plug-in, and/or a stand-alone application to interface with the network browsing application; and
a memory to store the history of media consumed at the user computing device, the processor further to identify one or more media items to recommend to a user based, at least in part, on the history of media consumed at the user computing device.

8. The server computing device of claim 7, wherein the one or more media players of the user computing device comprise one or more media players to download and/or stream media content via the Internet.

9. The server computing device of claim 7, wherein the processor further to identify media content most frequently consumed at the user computing device via the network browsing application.

10. The server computing device of claim 9, wherein the memory further to store an identification of the media content most frequently consumed at the user computing device via the network browsing application.

11. The server computing device of claim 9, wherein the processor further to communicate between the server computing device and the user computing device the one or more identified media items to recommend to the user, wherein the processor to identify the one or more media items to recommend to the user based at least in part on the identification of the media content most frequently consumed and/or on the history of media consumed at the user computing device.

12. The server computing device of claim 11, wherein, to communicate the one or more identified media items to recommend to the user, the processor to communicate digital content, the digital content to be selected based, at least in part, on the history of media consumed at the user computing device.

13. An article, comprising: a non-transitory computer readable storage medium having stored thereon instructions executable by a server computing device to:
obtain, from a user computing device, a history of media consumed at the user computing device, wherein the history of media consumed at the user computing device is collected at least in part via a sequence of instructions comprising a browser helper object to be executed at the user computing device at least in part in connection with a network browsing application, wherein the history of media consumed at the user computing device to identify media content consumed at the user computing device via the network browsing application and via one or more media players of the user computing device, wherein the browser helper object to comprise one or more of a network browsing application toolbar, a network browsing application plug-in, and/or a stand-alone application to interface with the network browsing application;
store the history of media consumed at the user computing device in a database at the server computing device; and
identify one or more media items to recommend to a user based, at least in part, on the history of media consumed at the user computing device.

14. The article of claim 13, wherein the computer readable storage medium having stored thereon further instructions executable by the server computing device to identify media content most frequently consumed at the user computing device via the network browsing application.

15. The article of claim 14, wherein the computer readable storage medium having stored thereon further instructions executable by the server computing device to store an identification of the media content most frequently consumed at the user computing device via the network browsing application.

16. The article of claim 14, wherein the computer readable storage medium having stored thereon further instructions executable by the server computing device to:
communicate between the server computing device and the user computing device the one or more identified media items to recommend to the user, wherein the computer readable storage medium having stored thereon further instructions executable by the server computing device to identify the one or more media items to recommend to the user based at least in part on the identification of the media content most frequently consumed and/or on the history of media consumed at the user computing device.

17. The article of claim 16, wherein, at least in part to communicate the one or more identified media items to recommend to the user, the computer readable storage medium having stored thereon further instructions executable by the server computing device to communicate digital content, wherein the digital content is to be selected based, at least in part, on the history of media consumed at the user computing device.

18. An apparatus, comprising:
means for obtaining, from a user computing device, a history of media consumed at the user computing device, wherein the history of media consumed at the user computing device is collected at least in part via a sequence of instructions comprising a browser helper object executed at the user computing device at least in part in connection with a network browsing application, wherein the history of media consumed at the user computing device identifies media content consumed at the user computing device via the network browsing application and via one or more media players of the user computing device, wherein the browser helper object comprises one or more of a network browsing application toolbar, a network browsing application plug-in, and/or a stand-alone application to interface with the network browsing application;
means for storing the history of media consumed at the user computing device; and
means for identifying one or more media items to recommend to a user based, at least in part, on the history of media consumed at the user computing device.

19. The apparatus of claim 18, wherein the one or more media players of the user computing device comprises one or more media players to download and/or stream media content via the Internet.

20. The apparatus of claim 18, further comprising means for identifying media content most frequently consumed at the user computing device via the network browsing application.

21. The apparatus of claim 20, further comprising means for storing an identification of the media content most frequently consumed at the user computing device via the network browsing application.

22. The apparatus of claim 18, further comprising:
means for communicating between the server computing device and the user computing device the one or more media items to recommend to the user.

23. The apparatus of claim 22, wherein the means for communicating the one or more identified media items to recommend to the user comprises means for communicating digital content, the digital content to be selected based, at least in part, on the history of media consumed at the user computing device.

* * * * *